（12）United States Patent
Chen et al.

(10) Patent No.: US 10,037,609 B2
(45) Date of Patent: Jul. 31, 2018

(54) VIDEO-BASED IDENTIFICATION OF OPERATIONAL MODE SHAPES

(71) Applicant: Massachusetts Institute of Technology, Cambridge, MA (US)

(72) Inventors: Justin Gejune Chen, Lexington, MA (US); Oral Buyukozturk, Chestnut Hill, MA (US); William T. Freeman, Acton, MA (US); Frederic Pierre Durand, Somerville, MA (US); Myers Abraham Davis, Cambridge, MA (US); Neal Wadhwa, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 72 days.

(21) Appl. No.: 15/012,835

(22) Filed: Feb. 1, 2016

(65) Prior Publication Data

US 2017/0221216 A1    Aug. 3, 2017

(51) Int. Cl.
*G06T 7/246*    (2017.01)

(52) U.S. Cl.
CPC .... *G06T 7/246* (2017.01); *G06T 2207/10016* (2013.01)

(58) Field of Classification Search
None
See application file for complete search history.

(56) References Cited

U.S. PATENT DOCUMENTS

| 7,532,541 | B2 | 5/2009 | Govindswamy et al. |
| 8,027,513 | B2 * | 9/2011 | Leichter ................. G06T 7/277 348/169 |
| 8,251,909 | B2 | 8/2012 | Arnold |
| 9,172,913 | B1 * | 10/2015 | Johnston .............. G06K 9/2036 |
| 9,324,005 | B2 * | 4/2016 | Wadhwa ................ G06K 9/481 |
| 9,811,901 | B2 * | 11/2017 | Wu ........................ G06T 7/0016 |
| 2008/0135762 | A1 | 6/2008 | Villanucci et al. |
| 2008/0151694 | A1 | 6/2008 | Slater |
| 2009/0095086 | A1 | 4/2009 | Kessler et al. |
| 2011/0222372 | A1 | 9/2011 | O'Donovan et al. |

(Continued)

FOREIGN PATENT DOCUMENTS

WO    WO 2016/145406 A1    9/2016

OTHER PUBLICATIONS

Vendroux, Gi, and W. G. Knauss. "Submicron deformation field measurements: Part 2. Improved digital image correlation." Experimental Mechanics 38.2 (1998): 86-92.*

(Continued)

*Primary Examiner* — Michelle M Entezari
(74) *Attorney, Agent, or Firm* — Hamilton, Brook, Smith & Reynolds, P.C.

(57) ABSTRACT

A method and corresponding device for identifying operational mode shapes of an object in a video stream includes extracting pixel-wise Eulerian motion signals of an object from an undercomplete representation of frames within a video stream. Pixel-wise Eulerian motion signals are downselected to produce a representative set of Eulerian motion signals of the object. Operational mode shapes of the object are identified based on the representative set. Resonant frequencies can also be identified. Embodiments enable vibrational characteristics of objects to be determined using video in near real time.

32 Claims, 11 Drawing Sheets

(3 of 11 Drawing Sheet(s) Filed in Color)

(56) References Cited

U.S. PATENT DOCUMENTS

| | | |
|---|---|---|
| 2011/0254842 A1 | 10/2011 | Dmitrieva et al. |
| 2012/0020480 A1 | 1/2012 | Visser et al. |
| 2012/0027217 A1 | 2/2012 | Jun et al. |
| 2013/0121546 A1* | 5/2013 | Guissin .............. G06T 7/0012 382/128 |
| 2013/0147835 A1 | 6/2013 | Lee et al. |
| 2013/0272095 A1 | 10/2013 | Brown et al. |
| 2013/0301383 A1 | 11/2013 | Sapozhnikov et al. |
| 2013/0329953 A1* | 12/2013 | Schreier .............. G06T 7/2093 382/103 |
| 2014/0072190 A1* | 3/2014 | Wu .................... G06T 7/0012 382/128 |
| 2014/0072228 A1 | 3/2014 | Rubinstein et al. |
| 2014/0072229 A1* | 3/2014 | Wadhwa .............. G06K 9/481 382/197 |
| 2015/0016690 A1 | 1/2015 | Freeman et al. |
| 2015/0319540 A1 | 11/2015 | Rubinstein et al. |
| 2016/0217587 A1* | 7/2016 | Hay ...................... G06T 7/11 |
| 2016/0267664 A1 | 9/2016 | Davis et al. |
| 2017/0109894 A1* | 4/2017 | Uphoff .................. G06T 7/20 |

OTHER PUBLICATIONS

Alam, Shafaf, Surya PN Singh, and Udantha Abeyratne. "Considerations of handheld respiratory rate estimation via a stabilized Video Magnification approach." Engineering in Medicine and Biology Society (EMBC), 2017 39th Annual International Conference of the IEEE. IEEE, 2017.*

Wang, Wenjin, Sander Stuijk, and Gerard De Haan. "Exploiting spatial redundancy of image sensor for motion robust rPPG." IEEE Transactions on Biomedical Engineering 62.2 (2015): 415-425.*

Nunez, Alfonso, et al. "A space-time model for reproducing rain field dynamics." (2007): 175-175.*

Shi, Cong, and Gang Luo. "A Streaming Motion Magnification Core for Smart Image Sensors." IEEE Transactions on Circuits and Systems II: Express Briefs (2017).*

Jobard, Bruno, Gordon Erlebacher, and M. Yousuff Hussaini. "Lagrangian-Eulerian advection of noise and dye textures for unsteady flow visualization." IEEE Transactions on Visualization and Computer Graphics 8.3 (2002): 211-222.*

Avitabile, P., "Modal space: Back to basics," *Experimental techniques*, 26(3):17-18 (2002).

Ait-Aider, O., et al., "Kinematics from Lines in a Single Rolling Shutter Image," Proceedings of CVPR '07. 6 pages (2007).

Bathe, K.J., "*Finite Element Procedures*" Publisher Klaus-Jurgen Bathe, 2006.

Boll, S.F., "Suppression of Acoustic Noise in Speech Using Spectral Subtraction," IEEE Trans. Acous. Speech Sig. Proc., ASSP-27(2): 113-120 (1979).

Brincker, R., et al., "Why output-only modal testing is a desirable tool for a wide range of practical applications," *Proc. of the International Modal Analysis Conference (IMAC) XXI*, Paper vol. 265. (2003).

Chen, J.G., et al., Structural modal identification through high speed camera video: Motion magnification. *Topics in Modal Analysis I*, J. De Clerck, Ed., Conference Proceedings of the Society for Experimental Mechanics Series. Springer International Publishing, vol. 7, pp. 191-197 (2014).

Chen, J.G., et al., "Modal Identification of Simple Structures with High-Speed Video Using Motion Magnification," Journal of Sound and Vibration, 345:58-71 (2015).

Chuang, Y.-Y., et al., "Animating pictures with Stochastic Motion Textures," *ACM Trans. on Graphics—Proceedings of ACM Siggraph*, 24(3):853-860 (Jul. 2005).

Davis, A., et al., "Visual Vibrometry: Estimating Material Properties from Small Motion in Video," *The IEEE Conference on Computer Vision and Pattern Recognition (CVPR)*, 2015.

Davis, A., et al., "Image-Space Modal Bases for Plausible Manipulation of Objects in Video," *ACM Transactions on Graphics*, vol. 34, No. 6, Article 239, (Nov. 2015).

de Cheveigne, A., "YIN, A Fundamental Frequency Estimator for Speech and Musica)," J. Acoust. Soc. Am., 111(4): 1917-1930 (2002).

DeRoeck, G., et al., "Benchmark study on system identification through ambient vibration measurements," *In Proceedings of IMAC-XVIII, the 18th International Modal Analysis Conference*, San Antonio, Texas, pp. 1106-1112 (2000).

Doretto, G., et al., "Dynamic textures," *International Journal of Computer Vision*, 51(2):91-109 (2003).

Garofolo, J.S., et al., "DARPA TIMIT Acoustic-Phonetic Continuous Speech Corpus CD-ROM," NIST Speech Disc 1-1.1 (1993).

Geyer, C., et al. "Geometric Models of Rolling-Shutter Cameras," EECS Department, University of California, Berkeley, 1-8.

Grundmann, M., et al., "Calibration-Free Rolling Shutter Removal," http://www.cc.gatech.edu/cpl/projects/rollingshutter, 1-8.

Hansen, J.H.L. and Pellom, B.L., "An Effective Quality Evaluation Protocol for Speech Enhancement Algorithms," Robust Speech Processing Laboratory, http://www.ee.duke.edu/Research/Speech.

Huang, J., et al., "Interactive shape interpolation through controllable dynamic deformation," *Visualization and Computer Graphics, IEEE Transactions* on 17(7):983-992 (2011).

James, D.L., and Pai, D.K., "Dyrt: Dynamic Response Textures for Real Time Deformation simulation with Graphics Hardware," *ACM Transactions on Graphics (TOG)*, 21(3):582-585 (2002).

James, D.L, and Pai, D.K., "Multiresolution green's function methods for interactive simulation of large-scale elastostagic objects," *ACM Transactions on Graphics (TOG)* 22(I):47-82 (2003).

Janssen, A.J.E.M., et al., "Adaptive Interpolation of Discrete-Time Signals That Can Be Modeled as Autoregressive Processes," IEEE Trans. Acous. Speech, Sig. Proc., ASSP-34(2): 317-330 (1986).

Jansson, E., et al. "Resonances of a Violin Body Studied," Physica Scripta, 2: 243-256 (1970).

Langlois, T.R., et al., "Eigenmode compression for modal sound models," *ACM Transactions on Graphics (Proceedings of SIGGRAPH 2014)*, 33(4) (Aug. 2014).

Li, S., et al., "Space-time editing of elastic motion through material optimization and reduction," *ACM Transactions on Graphics*, 33(4), (2014).

Loizou, P.C., Speech Enhancement Based on Perceptually Motivated Bayesian Estimators of the Magnitude Spectrum, IEEE Trans. Speech Aud. Proc., 13(5): 857-869 (2005).

Morlier, J., et al., "New Image Processing Tools for Structural Dynamic Monitoring."

Nakamura, J., "Image Sensors and Signal Processing for Digital Still Cameras," (2006).

Pai, D.K., et al., "Scanning Physical Interaction Behavior of 3d Objects," *Proceedings of the 28th Annual Conference on Computer Graphics and Interactive Techniques*, ACM, New York, NY, USA, SIGGRAPH '01, pp. 87-96 (2001).

Patsias, S., et al., "Damage Detection using Optical Measurements and Wavelets," *Structural Health Monitoring* 1(1):5-22 (Jul. 2002).

Pentland, A. and Sclaroff, S., "Closed-form Solutions for Physically Based Shape Modeling and Recognition," *IEEE Transactions on Pattern Analysis and Machine Intelligence*, 13(7):715-729 (Jul. 1991).

Pentland, A., and Williams. J., "Good vibrations: Modal Dynamics for Graphics and Animation," *SIGGRAPH '89 Proceedings of the 16th Annual Conference on Computer Graphics and Interactive Techniques, ACM*, vol. 23, pp. 215-222 (1989).

Portilla, J. and Simoncelli, E. P., "A Parametric Texture Model Based on Joint Statistics of Complex Wavelet Coefficients," Int'l. J. Comp. Vis., 40(1): 49-71 (2000).

Poudel, U., et al., "Structural damage detection using digital video imaging technique and wavelet transformation," *Journal of Sound and Vibration* 286(4):869-895 (2005).

Powell, R.L. and Stetson, K.A., "Interferometric Vibration Analysis by Wavefront Reconstruction," J. Opt. Soc. Amer., 55(12): 1593-1598 (1965).

Rothberg, S.J., et al., "Laser Vibrometry: Pseudo-Vibrations," J. Sound Vib., 135(3): 516-522 (1989).

Rubinstein, M., "Analysis and Visualization of Temporal Variations in Video," (2014).

(56) References Cited

OTHER PUBLICATIONS

Schödl, A., et al., "Video Textures," *Proceedings of the 27th Annual Conference on Computer Graphics and Interactive Techniques*, ACM Press/Addison-Wesley Publishing Co., New York, NY, USA, SIGGRAPH '00, pp. 489-498 (2000).
Shabana, A.A. *"Theory of Vibration,"* vol. 2., Springer (1991).
Simoncelli, E.P., et al.,"Shiftable multi-scale transforms," *IEEE Trans. Info. Theory*, 2(38):587-607 (1992).
Stam, J., "Stochastic Dynamics: Simulating the effects of turbulence on flexible structures", *Computer Graphics Forum*, 16(3):C159-C164 (1996).
Stanbridge, A.B. and Ewins, D.J., "Modal Testing Using a Scanning Laser Doppler Vibrometer," Mech. Sys. Sig. Proc., 13(2): 255-270 (1999).
Sun, M., et al., "Video input driven animation (vida)," *Proceedings of the Ninth IEEE International Conference on Computer Vision—vol. 2*, IEEE Computer Society, Washington, DC, USA, 96, (2003).
Szummer, M., and Picard, R.W., "Temporal texture modeling," *IEEE Intl. Conf. Image Processing*, 3:823-836 (1996).
Taal, C.H., et al.,"An Algorithm for Intelligibility Prediction of Time-Frequency Weighted Noisy Speech," IEEE Trans. Aud. Speech, Lang. Proc., 19(7): 2125-2136 (2011).
Tao, H., and Huang, T.S., "Connected vibrations: A modal analysis approach for non-rigid motion tracking," CVPR, *IEEE Computer Society*, pp. 735-740 (1998).
Van Den Doel, K., and Pai, D.K., "Synthesis of shape dependent sounds with physical modeling," *Proceedings of the International Conference on Auditory Display (ICAD)* (1996).
Zalevsky, Z., et al., "Simultaneous Remote Extraction of Multiple Speech Sources and Heart Beats from Secondary Speckles Pattern," Optic Exp., 17(24):21566-21580 (2009).
Zheng, C., and James, D.L., "Toward high-quality modal contact sound," *ACM Transactions on Graphics (TOG)*., vol. 30, ACM, 38 (2011).
Oxford English Dictionary entry for "optical," retrieved on Nov. 21, 2016 from http://www.oed.com/view/Entry/132057?redirectedFrom=optical#eid; 16 pages.
Caetano, E., et al., "A Vision System for Vibration Monitoring of Civil Engineering Structures," *Experimental Techniques*, vol. 35; No. 4; 74-82 (2011).
Chen, J. G., et al., "Long Distance Video Camera Measurements of Structures," *10th International Work-shop on Structural Health Monitoring (IWSHM 2015)*, Stanford, California, Sep. 1-3, 2015 (9 pages).
Chen, J. G., et al., "Developments with Motion Magnification for Structural Modal Identification through Camera Video," *Dynamics of Civil Structures*, vol. 2; 49-57 (2015).
Joshi, N., et al., "Image Deblurring using Inertial Measurement Sensors," *ACM Transactions on Graphics*, vol. 29; No. 4; 9 pages (2010).
Long, J. and Buyukorturk, O., "Automated Structural Damage Detection Using One-Class Machine Learning," *Dynamics of Civil Structures*, vol. 4; edited by Catbas, F. N., Conference Proceedings of the Society for Experimental Mechanics Series; 117-128; Springer International Publishing (2014).
Mohammadi Ghazi, R. and Buyukorturk, O., "Damage detection with small data set using energy-based nonlinear features," *Structural Control and Health Monitoring*, vol. 23; 333-348 (2016).
Park, S. H. and Levoy, M., "Gyro-Based Multi-Image Deconvolution for Removing Handshake Blur," *Computer Vision and Pattern Recognition (CVPR)*, Columbus, Ohio; 8 pages (2014).
Smyth, A. and Meiliang, W., "Multi-rate Kalman filtering for the data fusion of displacement and acceleration response measurements in dynamic system monitoring," *Mechanical Systems and Signal Processing*, vol. 21; 706-723 (2007).
Sohn, H., et al., "Structural health monitoring using statistical pattern recognition techniques," *Journal of Dynamic Systems, Measurement, and Control*, vol. 123; No. 4; 706-711 (2001).
Chen, J.G., et al., "Near Real-Time Video Camera Identification of Operational Mode Shapes and Frequencies," 1-8 (2015).
Davis, A., et al., "The Visual Microphone: Passive Recovery of Sound From Video," *MIT CSAIL*:1-10 (2014).
Fleet, D.J. and Jepson, A.D., "Computation of Component Image Velocity From Local Phase Information," *International Journal of Computer Vision* 5(1):77-104 (1990).
Freeman, W.T. and Adelson, E.H., "The Design and Use of Steerable Filters," *IEEE Transactions on Pattern Analysis and Machine Intelligence* 13(9):891-906 (1991).
Gautama, T. and Val Hulle, M.M., "A Phase-Based Approach to the Estimation of the Optical Flow Field Using Spatial Filtering," *IEEE Transactions on Neural Networks* 13(5):1127-1136 (2002).
Helfrick, M.N., et al., "3D Digital Image Correlation Methods for Full-field Vibration Measurement," *Mechanical Systems and Signal Processing* 25:917 -927 (2011).
Hermans, L. and Van Der Auweraer, H., "Modal Testing and Analysis of Structures Under Operational Conditions: Industrial Applications," *Mechanical and Systems and Signal Processing* 13(2):193-216 (1999).
Horn, B.K.P. and Schunck, B.G., "Determining Optical Flow," *Artificial Intelligence*, 17(1-3), 185-203 (1981).
Kim, S.-W. and Kim, N.-S., "Multi-Point Displacement Response Measurement of Civil Infrastructures Using Digital Image Processing," *Procedia Engineering* 14:195-203 (2011).
Liu, C., et al., "Motion Magnification," Computer Science and Artificial Intelligence Lab (CSAIL), Massachusetts Institute of Technology.
Lucas, B. D. and Kanade, T., "An Iterative Image Registration Technique With an Application to Stereo Vision," *Proceedings of the 7th International Joint Conference on Artificial Intelligence (IJCAI '81)*:674-679 (1981).
Park, J.-W., et al., "Vision-Based Displacement Measurement Method for High-Rise Building Structures Using Partitioning Approach," *NDT&E International* 43:642-647 (2010).
Poh, M.Z., et al., "Non-Contact, Automated Cardiac Pulse Measurements Using Video Imaging and Blind Source Separation," *Optics Express*, 18(10): 10762-10774 (2010).
Wadhwa, N., et al., "Phase-Based Video Motion Processing," *MIT Computer Science and Artificial Intelligence Lab*:1-9 (2013).
Wadhwa, N., et al.,"Riesz Pyramids for Fast Phase-Based Video Magnification," *MIT CSAIL*:1-10 (no date given).
Wu, H.-Y., et al., "Eulerian Video Magnification for Revealing Subtle Changes in the World," *MIT CSAIL*: 1-8 (2012).

\* cited by examiner

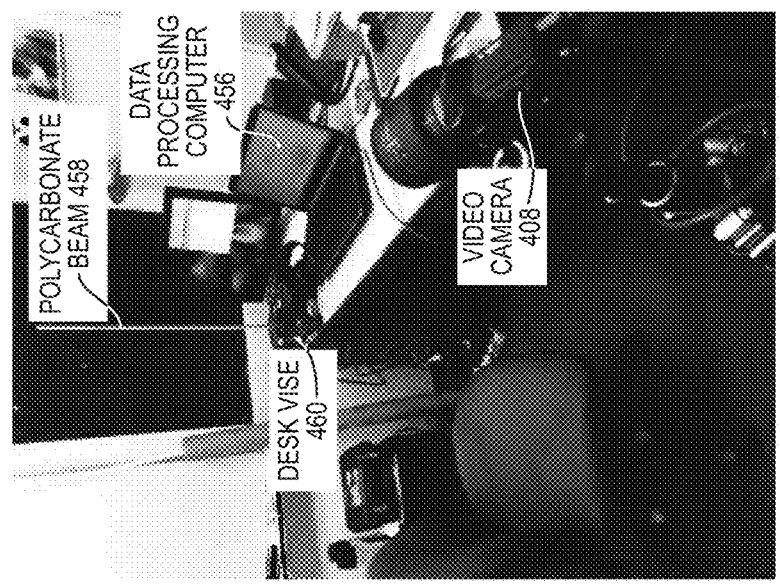

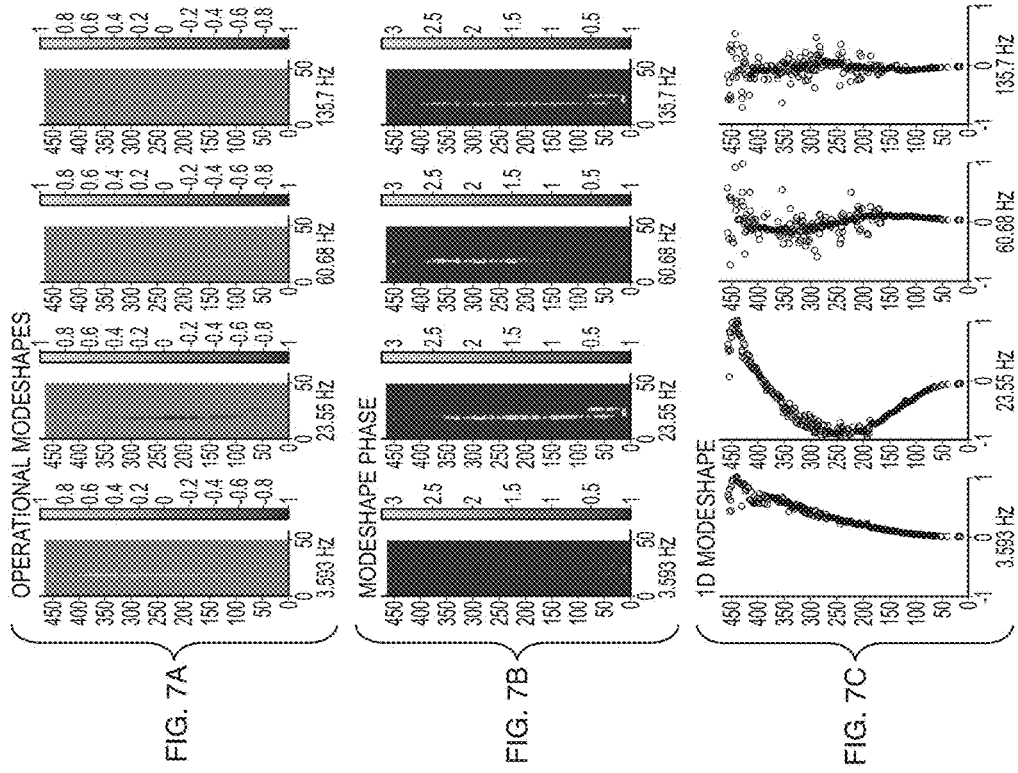

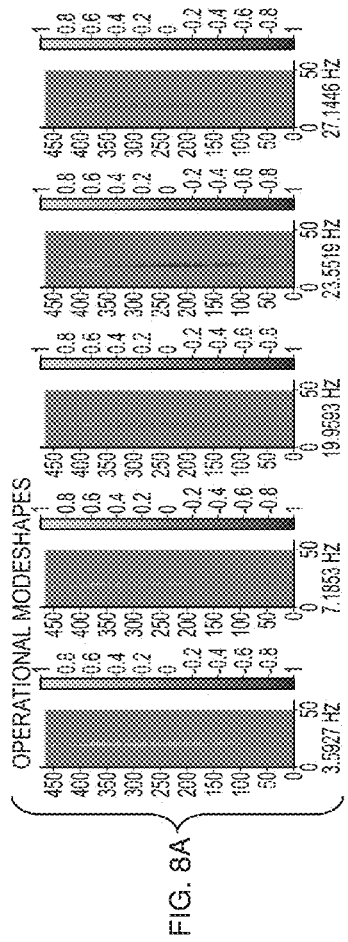
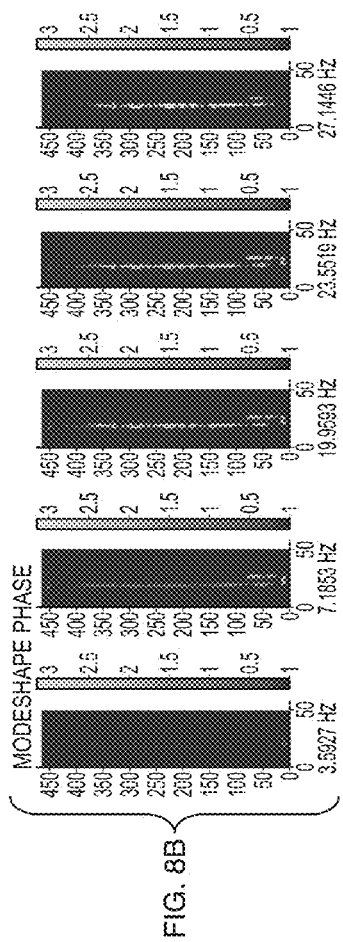
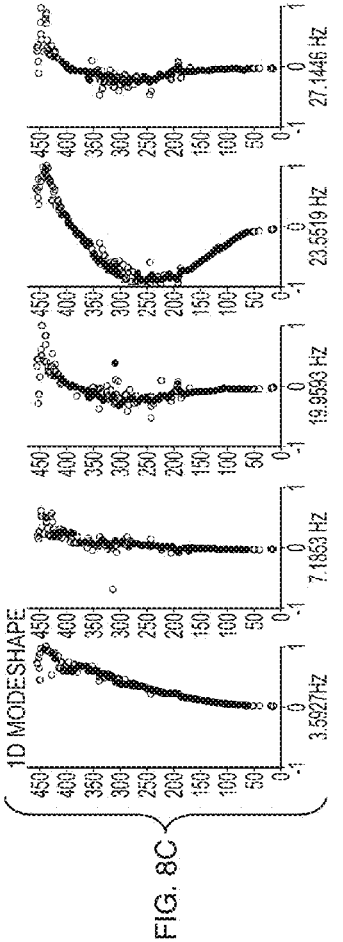
FIG. 8A
FIG. 8B
FIG. 8C

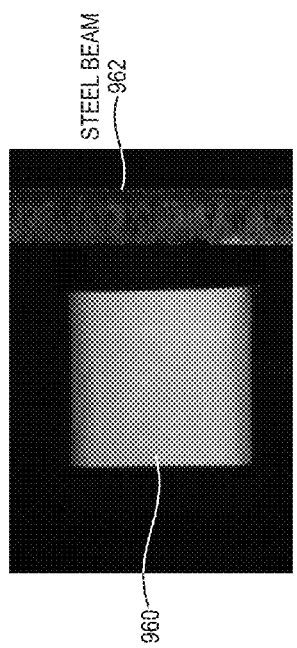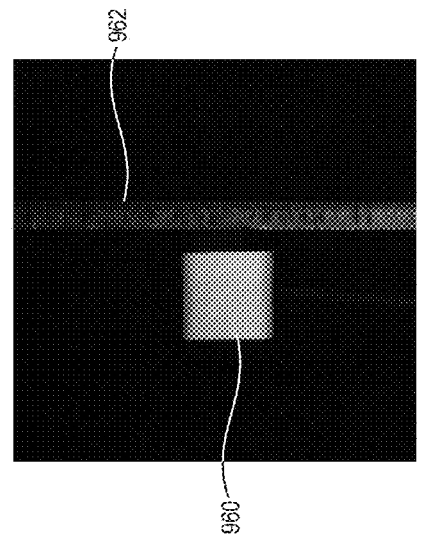
FIG. 9A — FRAME OF CROPPED SOURCE VIDEO 2000 fps, 301x201
FIG. 9B — FRAME OF SOURCE VIDEO 2000 fps, 576x576

| METHOD | ELAPSED TIME (s) | CPU TIME (s) |
|---|---|---|
| COMPLEX STEERABLE PYRAMID | 52.5 | 142.8 |
| NCORR DIG | 4756 | 4788 |
| G2 H2 (PARTIAL DISP.) | 1.31 | 3.69 |

301 x 201 PIXELS, 60,501 TOTAL PIXELS

FIG. 10A

| METHOD | ELAPSED TIME (s) | CPU TIME (s) |
|---|---|---|
| COMPLEX STEERABLE PYRAMID | 313.8 | 743.7 |
| NCORR DIG | 44,373 | 43,251 |
| G2 H2 (PARTIAL DISP.) | 6.65 | 20.3 |

576 x 576 PIXELS, 331,776 TOTAL PIXELS

FIG. 10B

| METHOD | DIFFERENCE |
|---|---|
| COMPLEX STEERABLE PYRAMID | 5.98x |
| NCORR DIG | 9.33x |
| G2 H2 (PARTIAL DISP.) | 5.08x |

FACTOR FOR INCREASE IN TIME (5.48x PIXELS)

FIG. 10C

VIDEO-BASED IDENTIFICATION OF OPERATIONAL MODE SHAPES

BACKGROUND

It is often desirable to measure vibrations of an object or small structure to determine operational resonant frequencies and mode shapes. Such measurements have been used to identify failure modes and test for potential structural vulnerabilities. Currently, accelerometers are used to measure these vibrations. Cameras have also been used in an attempt to monitor vibrations.

SUMMARY

The use of accelerometers to measure vibrations of an object or structure has several disadvantages. For example, accelerometers must be attached to an object that is being measured. For small structures, the added mass of accelerometers can negate the measurements performed on the object. Furthermore, where accelerometers are attached to large structures, the instrumentation and testing can be difficult physically and logistically. For either small or large objects, use of accelerometers, with the subsequent analysis, can require long periods of time.

Moreover, while some video-based vibration measurements have been attempted, existing methods for processing videos can be extremely time-consuming, because they use pattern matching or similar digital image correlation (DIC) methods to measure displacements. Furthermore, existing methods for processing videos often require targets with known patterns or lights to be placed on the structure of interest.

Disclosed herein are methods, devices, and systems that can be used for video-based system identification. Embodiments can enable estimates of resonant frequencies and operational mode shapes of an object to be obtained within minutes, rather than hours or days as with previous data processing procedures. Thus, analysis can be completed in near real-time. Disclosed embodiments do not require sensors or targets to be added to an object under test. Thus, no mass is required to be added to the object under test, and the dynamics of the object system under test are left unaltered by the measurement process. Furthermore, objects that are physically difficult to reach also can be measured in similar fashion, rapidly and without attached instruments.

Additionally, embodiments can produce high-resolution images of mode shapes of the vibrating object. In particular, pixel-wise Eulerian motion signals of the object can be extracted from an undercomplete representation of the frames of a video stream.

Furthermore, certain pixel-wise Eulerian motion signals can be downselected from motion signals extracted from the video stream to produce a representative set of motion signals based on, for example, local contrast in the image. Thus, processing of video frames can be completed much more quickly than with existing methods.

Disclosed embodiments can be used in many industries and applications requiring vibration measurements of structures, parts, and machinery. Small structures, for example, can be monitored by periodically checking for changes in the operational mode shapes and resonant frequencies. Parts coming off of a manufacturing line can be vibrationally tested for defects. In another example, videos of machinery that is rotating or otherwise in motion can provide information on the frequencies of vibration and parts of the object vibrating at those frequencies. Changes in those frequencies can be used to indicate mechanical failure, such as failure of bearings. In yet other example applications, cars can be measured for noise, vibrations, and harshness concerns to find sources of offending vibrations. Airplanes, for example, can be quickly inspected to check for defects in aluminum or composite structure by checking the vibrational mode shapes.

In one embodiment, a method of identifying operational mode shapes of an object in a video stream includes extracting pixel-wise Eulerian motion signals of an object from an undercomplete representation of frames within a video stream. The method also includes downselecting signals from the pixel-wise Eulerian motion signals to produce a representative set of Eulerian motion signals of the object. The method still further includes identifying operational mode shapes of the object based on the representative set of Eulerian motion signals from the undercomplete representation of the frames within the video stream.

The method can also include identifying motion frequencies of the object based on the representative set of motion signals from the undercomplete representation of the frames within the video stream. Downsampling signals prior to extracting the pixel-wise Eulerian motion signals can also be part of the method. The method can also include using an outlier analysis to remove erroneous motion signals from the pixel-wise Eulerian motion signals. Motion signals of the representative set of motion signals can also be averaged, and identifying operational mode shapes of the object can include using the averaged motion signals.

Downselecting the signals can include choosing signals on the basis of local contrast in the frames within the video stream. The pixel-wise Eulerian motion signals can be equal in number to the pixels within the frames of the video stream. Identifying the operational mode shapes can include determining a frequency spectrum for each motion signal of the representative set of motion signals.

The method can also include generating a visual representation of the operational mode shapes or motion signals of the object. End-to-end processing of the frames of the video stream to identify the operational mode shapes of the object can be performed at a rate at least one order of magnitude faster than digital image correlation (DIC). The method can also include uploading the frames within the video stream to a remote server or downloading the operational mode shapes from the remote server. The extracting, downselecting, and identifying can occur at a network server and operate on the frames received via a network path.

In another embodiment, a device for identifying operational mode shapes of an object in a video stream includes memory configured to store frames from a video stream of an object. The device also includes a processor configured to (i) extract pixel-wise Eulerian motion signals of the object from an undercomplete representation of the frames from the video stream, (ii) downselect signals from the Eulerian pixel-wise motion signals to produce a representative set of Eulerian motion signals of the object, and (iii) identify operational mode shapes of the object based on the representative set of Eulerian motion signals from the undercomplete representation of the frames within the video stream.

The processor can be further configured to identify motion frequencies of the object based on the representative set of motion signals from the undercomplete representation of the frames within the video stream. The processor can also be configured to downselect the signals on the basis of local contrast in the frames within the video stream. The processor can be further configured to downsample signals prior to extracting the pixel-wise Eulerian motion signals and to perform end-to-end processing of the video stream to obtain the operational mode shapes of the object at least one order of magnitude faster than DIC. The pixel-wise Eulerian motion signals can be equal in number to the pixels within the frames of the video stream.

The processor can be further configured to perform an outlier analysis to remove erroneous motion signals from the pixel-wise Eulerian motion signals. The processor can also be configured to average two or more motion signals of the representative set of motion signals and to identify the operational mode shapes of the object based on the averaged representative set of motion signals. The processor can also be configured to determine a frequency spectrum for each motion signal of the representative set of motion signals.

The device can also include a visual interface configured to display a representation of the operational mode shapes or motion signals of the object. The device can further include a communications interface configured to upload the video stream of the object to a remote server or to download the operational mode shapes of the object from the remote server.

The memory and processor can form part of a network server configured to receive the frames from the video stream via a network path. The memory can be operational mode shape video storage memory configured to store a number of video frames spanning at least one motion period corresponding to a resonant frequency of the object.

The processor can be an operational mode shape data processor configured to receive the video frames of the object and to extract the pixel-wise Eulerian signals by applying oriented complex spatial bandpass filters to data representing individual pixels of the frames within the video stream. The operational mode shape data processor can be further configured to determine local phase and local amplitude to extract the pixel-wise Eulerian motion signals and determine edge strength of pixels in the frames within the video stream simultaneously.

A quality control system can include any device according to disclosed embodiments, wherein the object is a product being manufactured or tested. The quality control system can also include a vibration transducer configured to cause vibration of the product, as well as an operational mode shape video camera configured to capture images of the product during vibration.

An equipment monitoring system can include any device according to disclosed embodiments, wherein the object includes a component of a machine, the component being in motion during machine operation. The equipment monitoring system can also include an operational mode shape video camera configured to capture images of the one or more components in motion, and the processor can be further configured to identify an unwanted motion frequency in the component in motion.

In a further embodiment, a device for identifying operational mode shapes of an object in a video stream includes: (i) means for extracting pixel-wise Eulerian motion signals of an object from an undercomplete representation of frames within a video stream, (ii) means for downselecting signals from the pixel-wise Eulerian motion signals to produce a representative set of Eulerian motion signals of the object, and (iii) means for identifying operational mode shapes of the object based on the representative set of Eulerian motion signals from the undercomplete representation of the frames within the video stream.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 4A illustrates a desktop experiment set up to perform measurements according to embodiments of the invention.

FIG. 4B is a photograph showing one screenshot of the recorded video produced by a camera in FIG. 4A.

FIG. 4C illustrates pixels of the image in FIG. 4B for which displacements were calculated for experimental data.

FIG. 7A is a series of graphs, for various manually chosen suspected resonant frequencies, illustrating operational mode shape amplitudes, color-coded, on a per-pixel basis.

FIG. 7B is a series of graphs, for the suspected resonant frequencies indicated in FIG. 7A, illustrating mode shape phases, color-coded, for the respective, manually chosen frequencies.

FIG. 7C is a series of graphs, for the suspected resonant frequencies indicated in FIGS. 7A-7B, illustrating one-dimensional representations of given mode shapes corresponding to the respective, manually chosen frequencies.

FIG. 8A is a series of graphs, for various automatically chosen suspected resonant frequencies, illustrating operational mode shape amplitudes, color-coded, on a per-pixel basis.

FIG. 8B is a series of graphs, for the suspected resonant frequencies indicated in FIG. 8A, illustrating mode shape phases, color-coded, for the respective, automatically chosen frequencies.

FIG. 8C is a series of graphs, for the suspected resonant frequencies indicated in FIGS. 8A-8B, illustrating one-dimensional representations of given mode shapes corresponding to the respective, automatically chosen frequencies.

FIG. 9A is a cropped photograph illustrating part of an individual frame of the video obtained using the experimental setup shown in FIG. 4A, but with a steel cantilever beam.

FIG. 9B is an uncropped version of the photograph in FIG. 9A.

FIGS. 10A-10C are tables showing speed comparison data for extraction of displacements from a video using complex steerable pyramid, NCORR Digital Image Correlation (DIC), and G2/H2 filtering approaches.

DETAILED DESCRIPTION

Figure 1:
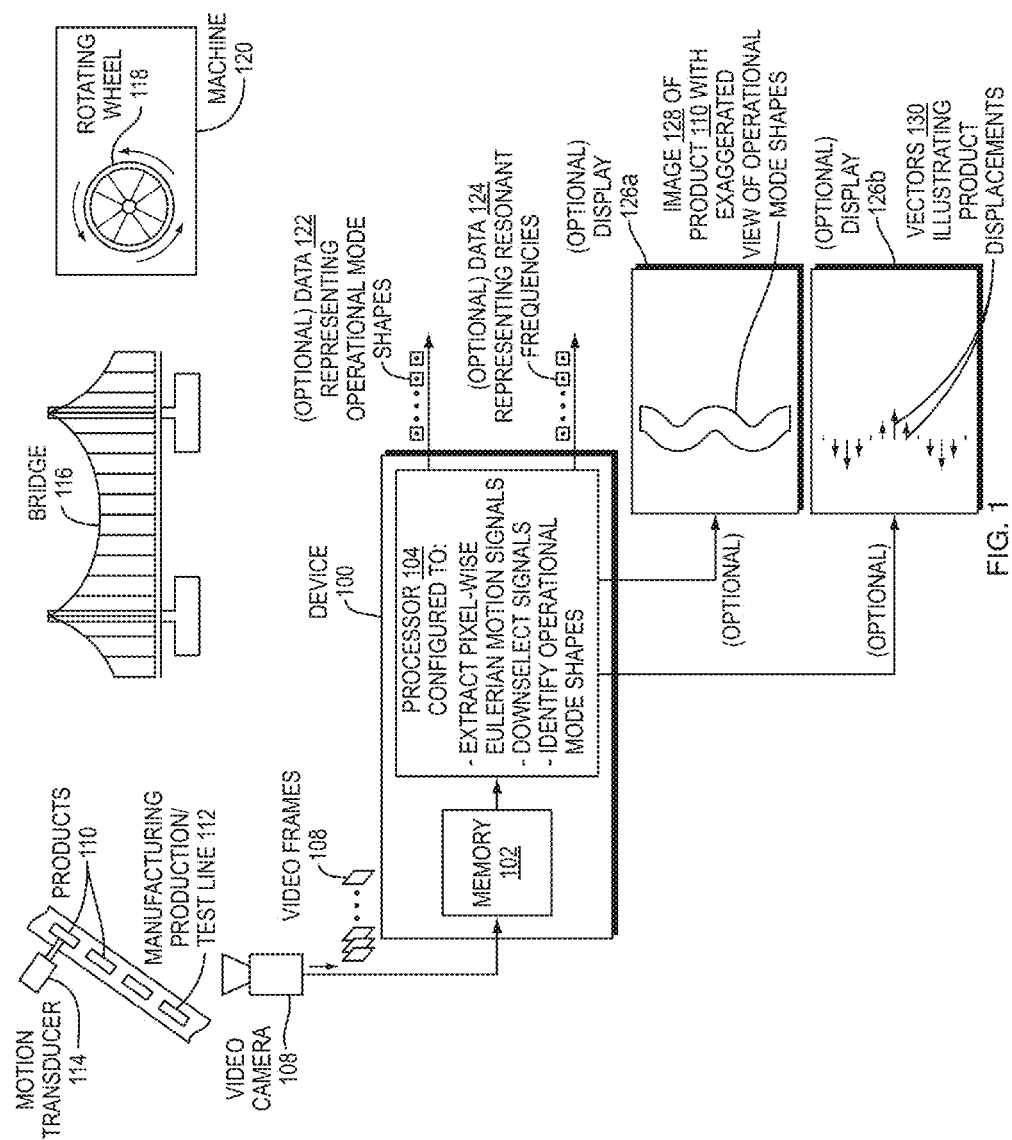
FIG. 1 is a schematic diagram illustrating a device for identifying operational mode shapes of an object in a video stream in the context of multiple real-world applications.

A description of example embodiments of the invention follows.

As noted hereinabove, the use of accelerometers to measure vibrations of an object or structure has disadvantages for many reasons, including inconvenience of setup and disturbance of measured structures. Further, as noted hereinabove, previous attempts to measure vibration using video measurements have been extremely time-consuming, because they use pattern matching or similar digital image correlation (DIC) methods to measure displacements. For example, Helfrick, Mark N., et al. "3D digital image correlation methods for full-field vibration measurement." *Mechanical systems and signal processing* 25.3 (2011): 917-927, uses a video-based method but relies on DIC, making analysis slow. Furthermore, existing methods for processing videos often require targets with known patterns or lights to be placed on the structure of interest, which is also not desirable or feasible for many applications. For example, Park, Jong-Woong, et al. "Vision-based displacement measurement method for high-rise building structures using partitioning approach." *NDT & E International* 43.7 (2010): 642-647, describes video analysis but relies on specially designed targets being viewed. In yet another example, Kim, Sung-Wan, and Nam-Sik Kim. "Multi-point displacement response measurement of civil infrastructures using digital image processing." *Procedia Engineering* 14 (2011): 195-203, relies on both DIC and use of targets.

Disclosed herein are methods, devices, and systems that can be used for video-based system identification without the inconvenience of targets and without the analytical speed constraints of DIC. Embodiments can enable estimates of resonant frequencies and operational mode shapes of an object to be obtained within minutes, rather than hours or days as with previous data processing procedures. Thus, analysis can be completed in near real-time. Disclosed embodiments do not require sensors or targets to be added to an object under test. Thus, no mass is required to be added to the object under test, and the dynamics of the object system under test are left unaltered by the measurement process. Furthermore, objects that are physically difficult to reach also can be measured in similar fashion, rapidly and without attached instruments.

Downselection of pixels, as described hereinafter, can be applied to pixel-wise Eulerian motion signals to produce a much smaller, representative set of Eulerian motion signals that represent the most salient motion points of the object. Salient motion points can be edges of the object where local contrast in images is greatest, for example. Thus, processing of video frames can be completed much more quickly than with existing methods.

Additionally, embodiments can produce high-resolution images of mode shapes of the vibrating object. In particular, pixel-wise Eulerian motion signals of the object can be extracted from an undercomplete representation of the frames of a video stream.

Disclosed embodiments can be used in many industries and applications requiring vibration measurements of structures, parts, and machinery. Small structures, for example, can be monitored by periodically checking for changes in the operational mode shapes and resonant frequencies. Products in a manufacturing line, for example, can be vibrationally tested for defects. In particular, a device as described hereinafter in connection with FIG. 1 can be combined with a vibration transducer configured to cause vibration of the part (product) and an operation mode shape video camera configured to capture video images of the product during vibration, forming a quality control system to test products being manufactured or otherwise tested.

In another example, videos of machinery that is rotating or otherwise in motion can provide information on the frequencies of vibration and parts of the object vibrating at those frequencies. Changes in those frequencies can be used to indicate mechanical failure, such as failure of bearings. In particular, an equipment monitoring system can include the device as described in connection with FIG. 1, together with an operational mode shape video camera configured to acquire images of components (parts) of the machinery in motion during machine operation. A processor in the device described in FIG. 1 can be configured to identify unwanted motion frequency of the component or part, where the frequency can indicate damage to the machine or a failure of the machine.

In yet other example applications, cars can be measured for noise, vibrations, and harshness concerns to find sources of offending vibrations. Airplanes, for example, can be quickly inspected to check for defects in aluminum or composite structure by checking the vibrational mode shapes. Furthermore, embodiment devices can be used to analyze buildings or structures that respond to natural or human-made forces.

FIG. 1 is a schematic diagram illustrating an embodiment device 100 for identifying operational mode shapes of an object in a video stream. The device 100 includes memory 102 and a processor 104. The memory 102 is configured to store the video frames 106 that form a video stream provided by a video camera 108. The memory 108 can be referred to as "operational mode shape video storage memory" and can be optionally configured to store a number of video frames spanning at least one motion period corresponding to a resonant frequency of the object being test. Example motion periods include the ~0.5 s motion periods illustrated in the average displacement signal shown in FIG. 6A. As used herein, "video camera" can include any imaging device capable of providing a series of images for motion visualization.

The video camera 108 can be configured to capture images of a variety of different objects, such as a bridge 116, or other structure, such as a building. The video camera can also be configured to capture images, and produce a video stream, of objects, such as products 110 on a manufacturing production/test line 112. In such a production/test environment, the products 110 may be tested through inducing motion by any means known in the art of vibrational testing. In the case illustrated in FIG. 1, a motion transducer 114 is applied to a product, inducing motion that can be captured with frames of the video camera 108. In other embodiments, a product may be placed on a vibration table, for example. It is known, for example, that manufactured objects may have different vibrational characteristics if they are damaged.

In some embodiments, the motion transducer 114 drives a product at a fixed frequency. However, in other embodiments, the motion transducer 114 can drive a product at a range of drive input frequencies, and responses at the various frequencies can be captured with frames of the video camera 108 and further used as described hereinafter by a processor to identify operational mode shapes or resonant frequencies. Other objects for which mode shapes and resonant frequencies may be useful to capture with video frames of the video camera 108 include machinery with moving or rotating parts, such as a machine 120 with a rotating wheel 118. Certain resonant frequencies, or amplitudes of resonant frequencies, or given operational mode shapes can indicate failure modes of machinery, for example. Thus, embodiments of the device 100 can be advantageously utilized in a variety of civil engineering, manufacturing, test, and monitoring environments.

Furthermore, embodiments of the device 100 can be useful for model validation. For example, in many cases, it is useful to test for operational mode shapes and resonant frequencies of prototype devices or structures. Such measurements can be used to compare with vibrational characteristics predicted based on models of the device, for example. Then models of the device can be updated to reflect data for the physical prototype device, or the physical prototype can be updated to ensure that it is produced to correct mechanical specifications, for example.

The processor 104 is configured to identify operational mode shapes of the object whose motion is capture by the video camera 108, such as the product 110. Specifically, the processor is configured to extract pixel-wise Eulerian motion signals of the object from an undercomplete representation of the frames 106 from the video stream. The processor 104 is further configured to downselect signals from the Eulerian pixel-wise motion signals to produce a representative set of Eulerian motion signals of the object. As an additional step, the processor 104 identifies operational mode shapes of the object based on the representative set of Eulerian motion signals from the undercomplete representation of the frames 106 within the video stream. These aspects of manipulation of the video frames 106 to identify operational mode shapes are described further hereinafter.

The processor 104 in the device 100 can be further configured to output data 122 representing the operational mode shapes and data 124 representing resonant frequencies. The processor 104 can be referred to as an "operational mode shape data processor" herein and can be configured to received video frames of the object being tested and to extract the pixel-wise Eulerian signals by optionally applying oriented complex spatial bandpass filters to data representing individual pixels, sets of averaged pixels, in the frames within the video stream.

As used herein, "processor" should be understood to include any data processor that can be configured to perform the functions of extracting pixel-wise Eulerian motion signals, downselecting signals, and identifying operational mode shapes, as described hereinabove. Furthermore, a "processor" can be part of a mobile device, computer, server, embedded processor, or other device. Moreover, the "processor" as used herein can include a series of processors, such as a distributed intelligence system, where specific processing functions can be completed at different sub-processors located in the same device or in multiple devices, either in close proximity with each other or at various mutually remote locations connected by a wired, wireless, or optical network, for example.

The device 100, or a system including the device 100, can also optionally include a visual interface configured to display a representation of the operational mode shapes or motion signals of the object. For example, FIG. 1 illustrates an optional display 126a, which can include a computer screen, printed paper, or any other viewable medium. The display 126a includes an image 128 of the product 110, showing an exaggerated view of operational mode shapes detected by the processor 104. FIG. 1 also illustrates an alternative optional display 126b, which illustrates displacements of the product 110 as vectors 130. Similar graphical representations of operational mode shapes are further described hereinafter in connection with FIGS. 7C and 8C, for example.

As will be understood by those skilled in the art, a variety of other representations of the operational mode shapes or resonant frequencies could also be produced. The image 128 and vectors 130 are illustrated in FIG. 1 as being provided by the processor 104 in the device 100. However, in other embodiments, the display is 126a and 126b can be calculated based on the data 122 or data 124 representing operational mode shapes or resonant frequencies, respectively, by another processor that receives these data from processor 104.

Figure 2A:
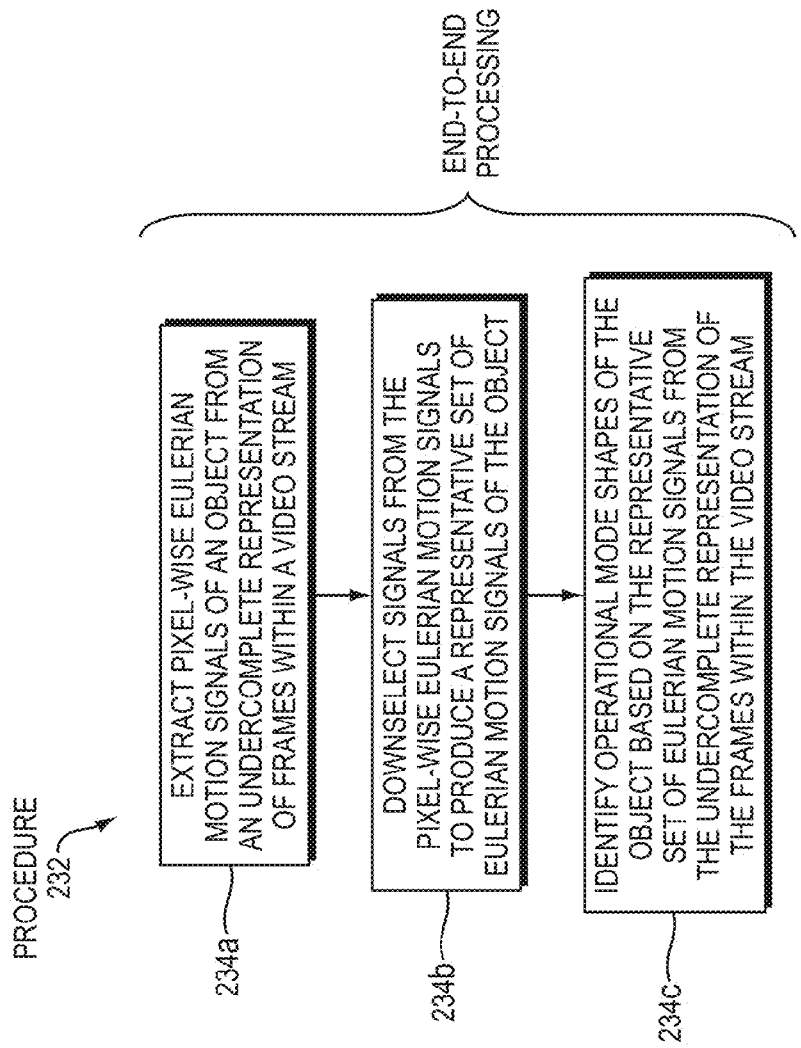
FIG. 2A is a flow diagram illustrating a procedure for identifying operational mode shapes of an object in a video stream.

FIG. 2A is a flow diagram illustrating a procedure 232 for identifying operational mode shapes of an object in a video stream. At 234a, pixel-wise Eulerian motion signals of an object are extracted from frames from an undercomplete representation of the frames within the video stream. Extracted motion signals generally form an undercomplete representation of frames within a video only after applying a filter pair, as further described hereinafter. Once processing is performed on an undercomplete representation to obtain the motion signals, the motion signals are no longer a representation of the video, but only information extracted from the video. In other words, the video cannot be reconstructed from the undercomplete representation of the frames within the video.

At 234b, signals are downselected from the pixel-wise Eulerian motion signals to produce a representative set of Eulerian motion signals of the object. At 234c, operational mode shapes of the object are identified based upon the representative set of Eulerian motion signals from the undercomplete representation of the frames within the video stream.

Figure 2B:
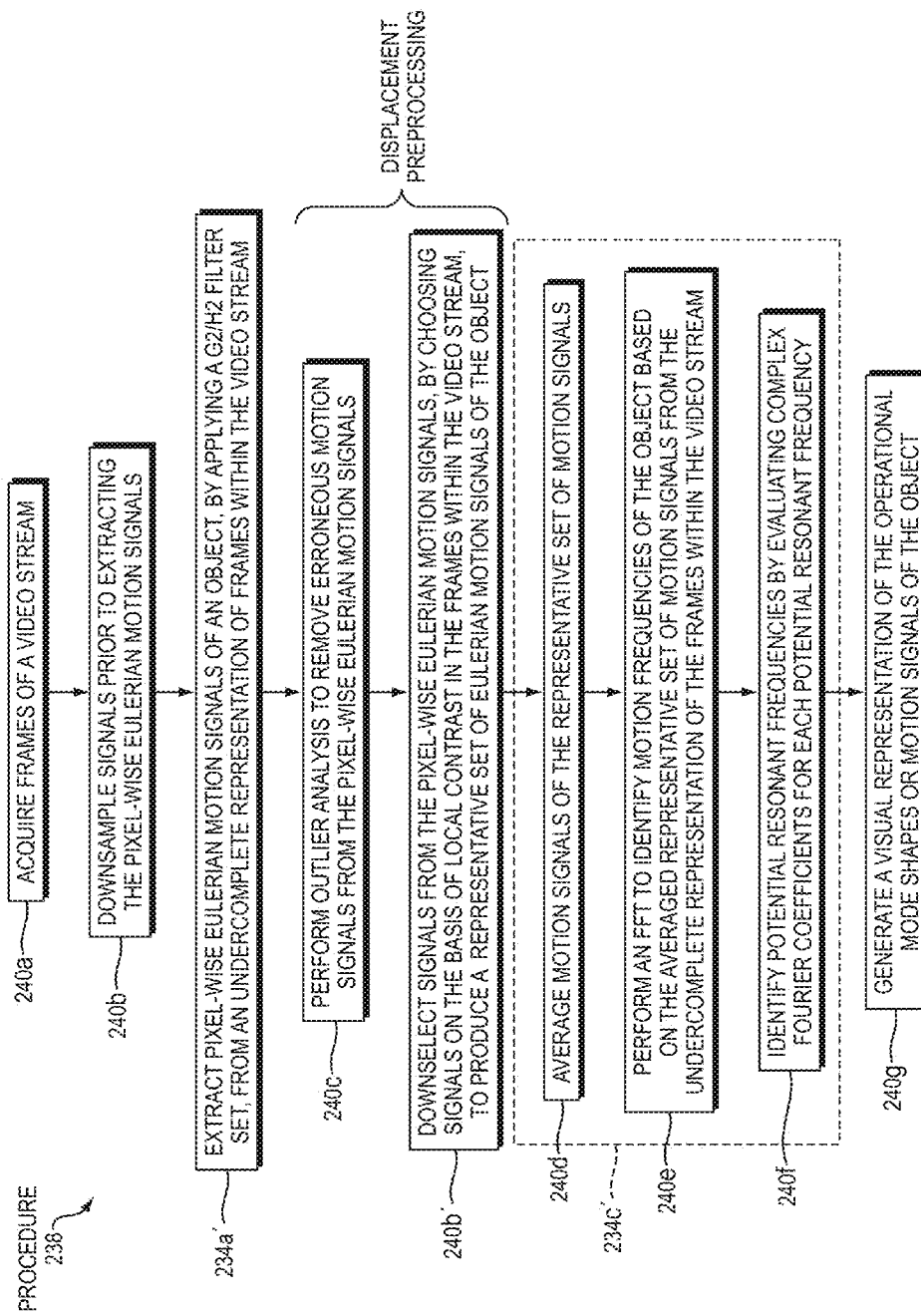
FIG. 2B is a flow diagram illustrating an alternative procedure for identifying operational mode shapes of an object in a video stream.

The procedure 232 may be performed by the device 100 illustrated in FIG. 1 or by the server at 344 described hereinafter in connection with FIG. 3, for example. In certain embodiments, end-to-end processing, including the extracting, downselecting, and identifying operational mode shapes, can be performed essentially real-time. For example, in some embodiments, end-to-end processing of the video stream to identify the operational mode shapes of the object can be performed at a rate at least one order of magnitude faster than digital image correlation (DIC) such as NCORR DIC. NCORR DIC is an open source, two-dimensional MATLAB®-based DIC program, and results of analysis using NCORR DIC are further described hereinafter in relation to FIGS. 10A-10C. Furthermore, in certain embodiments, extracting, downselecting, or identifying may be completed in particular, optional ways, and procedures for identifying operational mode shapes can include various other optional procedure elements. Some of these particular procedure elements and variations are illustrated in FIG. 2B, for example. Further technical description of elements of the procedures illustrated in FIG. 2A-2B is also included hereinafter.

FIG. 2B illustrates an alternative procedure 238 for identifying operational mode shapes of an object in a video stream. At 240a, frames of the video stream are acquired. This can be done, for example, by the video camera 108 illustrated in FIG. 1 or by other cameras and devices described hereinafter in connection with FIG. 3.

At 240b, motion signals are downsampled prior to extracting the pixel-wise Eulerian motion signals. Downsampling can include spatially averaging pixels in the video frames to increase signal-to-noise (S/R) ratios and change the spatial scale of vibrational monitoring, as further described hereinafter.

At 234a', as at 234a in FIG. 2A, pixel-wise Eulerian motion signals are extracted from an undercomplete representation of the frames within the video stream. Formation of an undercomplete representation of the frames within the video stream is particularly described hereinafter in relation to Equation (1), for example. The particular extraction performed at 234a' is done by applying a G2/H2 filter set. This extraction is further described hereinafter in relation to Equation (4), for example. However, in other embodiments, other sets of oriented complex spatial bandpass filters, for example, may be used. Use of these filters is described further hereinafter.

At 240c, an outlier analysis is performed to remove erroneous motion signals from the pixel-wise Eulerian motion signals. Signals from certain pixels that exceed a given threshold, for example, may be disregarded as not reasonably representing real motion, for example. Such outlier analysis is described further hereinafter.

At 234b', as at 234b in FIG. 2A, signals from the pixel-wise Eulerian motion signals are downselected to produce a representative set of Eulerian motion signals of the object. In particular, at 234b', downselection of signals is performed by choosing signals on the basis of local contrast in the frames within the video stream. In particular, two methods of downselection based on local contrast are described hereinafter. After downselection, the representative set of Eulerian motion signals selected for further analysis to determine operational mode shapes and representative motion frequencies may represent only the edges of an object, for example. Downselection is further described hereinafter in relation to data preprocessing and FIG. 4C. The downselection and outlier analysis can be referred to as "displacement processing" herein, as indicated in FIG. 2B.

Figure 5B:
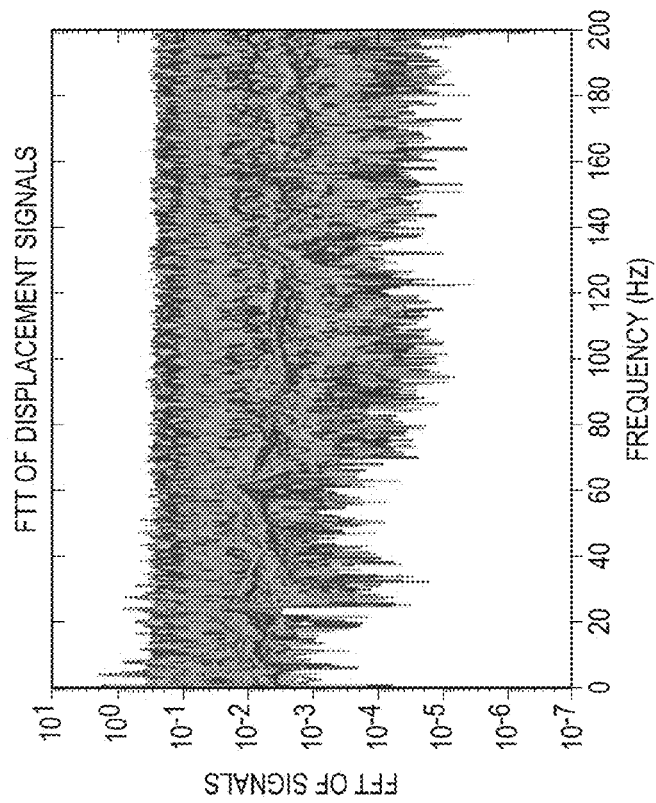
FIG. 5B is a graph illustrating a composite of all the frequency spectra for the motion signals illustrated in FIG. 5A.
Figure 5A:
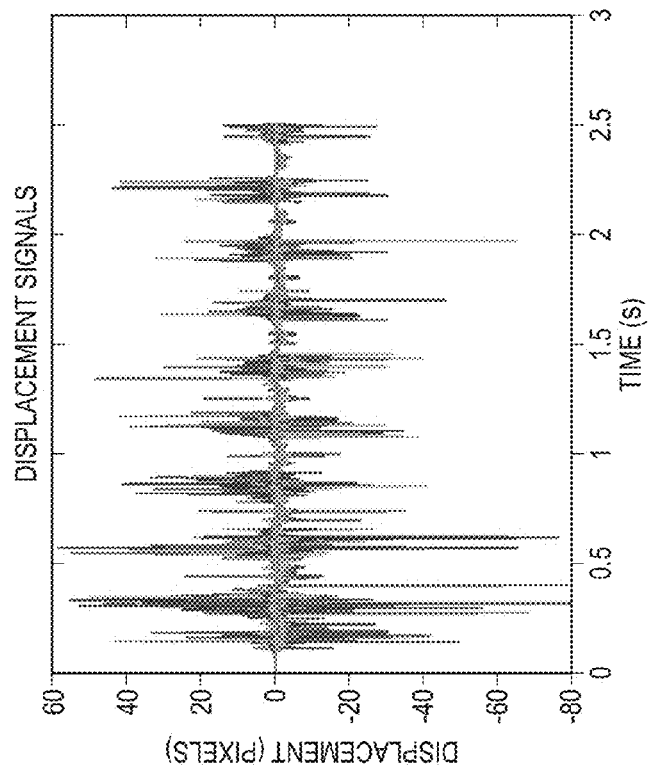
FIG. 5A is a graph illustrating a composite of all the motion displacement signals for the pixels illustrated in FIG. 4C.

Such a representative set of Eulerian motion signals can be a significantly smaller set of Eulerian motion signals that can be analyzed particularly quickly. A representative set of downselected pixels is shown in FIG. 4C, for example. A representative set of Eulerian motion signals from the downselected pixels in FIG. 4C is illustrated in FIG. 5A, for example. Thus, downselection of signals on the basis of local contrast in the frames can be performed in order to further process only particularly salient pixel signals from the video frames representing the most significant motion to be analyzed. In this way, end-to-end processing, as illustrated in FIG. 2A, can be performed at a rate that is potentially much higher than the processing rate for existing methods, including at least one order of magnitude faster than DIC.

Figure 6B:
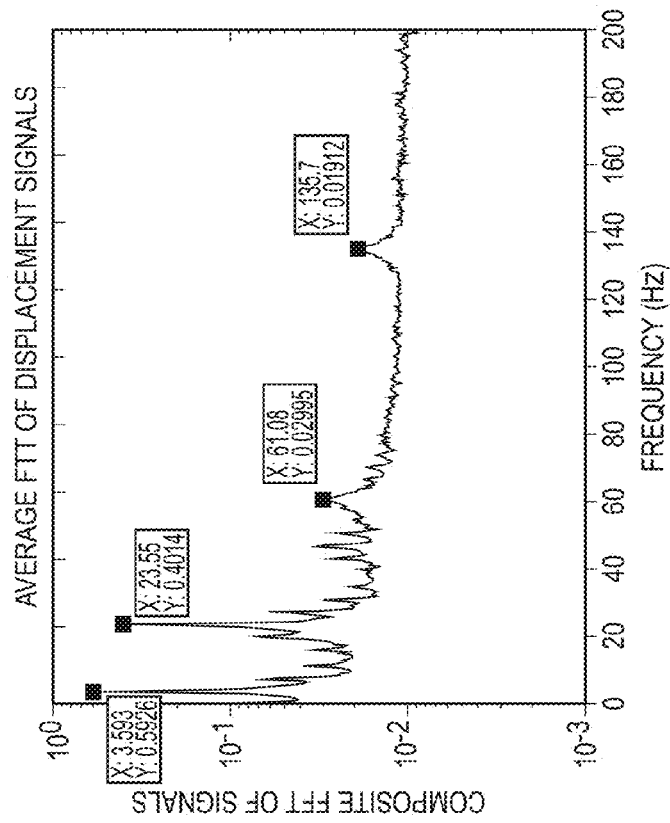
FIG. 6B is a graph showing an average FFT spectrum that averages all the pixel-wise frequency spectra shown in FIG. 5B.
Figure 6A:
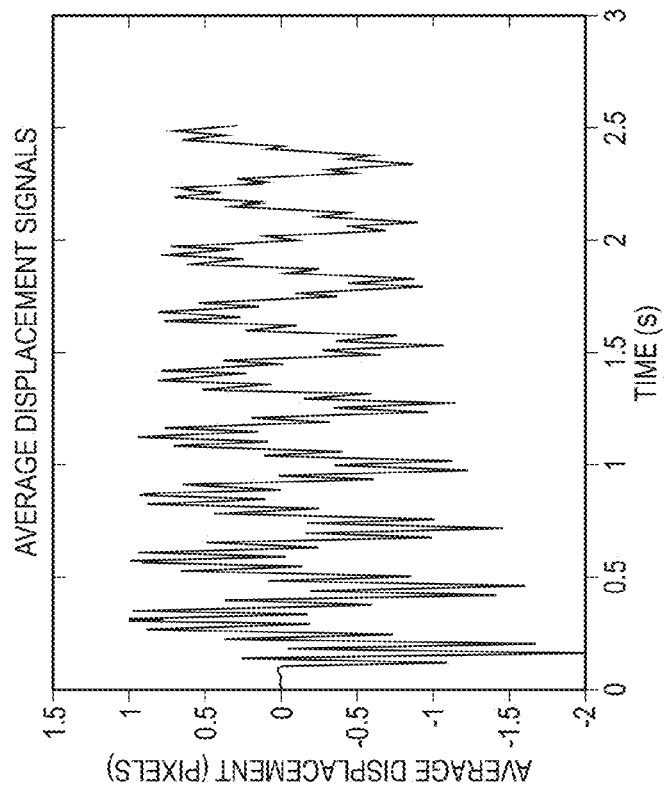
FIG. 6A is a graph showing an averaged motion displacement signal spectrum for the displacements shown in FIG. 5A.

At 234c', as at 234c in FIG. 2A, operational mode shapes of the object are identified based on the representative set of Eulerian motion signals from the undercomplete representation of the frames within the video stream. In particular, at 240d, motion signals of the representative set of motion signals are averaged to increase the S/N ratio further, as well as decrease the number of data points to be further processed. Such averaging is optional and can be done based on the spatial resolution inherent to the device used to acquire the video frames and on the resolution required in the particular vibrational analysis being performed. An example of such averaging of a representative set of Eulerian motion signals is illustrated in FIG. 6A, for example.

At 240e, a fast Fourier transform (FFT) is performed to identify motion frequencies of the object based on the average representative set of motion signals from the undercomplete representation of the frames within the video stream. As an alternative, in some embodiments, motion signals can be averaged, as done at 240d, after performing the FFT. Some FFT examples are described hereinafter in connection with FIG. 5B and FIG. 6B, for example. Thus, the FFT can be completed either based on pre-averaged motion signals or based on an averaging of FFTs completed on un-averaged motion signals. At 240f, potential resonant frequencies are identified by evaluating complex Fourier coefficients for each potential resonant frequency, as further described hereinafter. An example of FFTs of individual signals of the representative set of Eulerian motion signals is illustrated in FIG. 5B. An example of an averaged, composite FFT formed from individual FFTs of a representative set of Eulerian motion signals is illustrated in FIG. 6B. Example identifications of motion frequencies representing potential resonant frequencies are illustrated in FIG. 6B.

At 240g, a visual representation of the operational mode shapes or motion signals of the object is generated. Such a representation can include, for example, the image 128 or vectors 130 illustrated in FIG. 1. However, it will be understood that operational mode shapes and motion signals and resonant frequencies of the object can be represented visually and graphically in many different ways.

Further Technical Description of Specialized Processing in Example Procedures

As described hereinabove, FIGS. 2A and 2B illustrate example workflows that can be performed, according to particular disclosed embodiments, by particular, specially-configured processors such as those described in relation to FIGS. 1 and 3. In example embodiments, a video camera can record a short video of the object under test, either under operational vibration conditions, or externally excited by a user. Operational vibration conditions can occur during operation of the machine 120 illustrated in FIG. 1, or as the bridge 116 in FIG. 1 responds to natural forces such as wind or water flow, for example. External excitation conditions can be accomplished with a motion transducer or vibration table, for example, as described in relation to FIG. 1.

In-image-plane displacements of the object under test can be extracted from frames of the video. An FFT can be taken of all the displacement signals and averaged to obtain an average frequency spectrum for the objects vibration from the video frames. Peaks in the frequency spectrum can be noted as suspected resonant frequencies, and images of the operational mode shapes can be generated from the displacements. These operational mode shapes can then be visualized, in particular embodiments, using a fast phase-based motion magnification algorithm in narrow frequency bands around the suspected resonant frequencies. Such motion magnification has been described, for example, in Wadhwa, N., Rubinstein, M., Durand, F. and Freeman, W. T., *Riesz Pyramid for Fast Phase-Based Video Magnification, Computational Photography (ICCP), 2014 IEEE International Conference on*, IEEE, 2014, which is incorporated herein by reference in its entirety.

Downsampling Pixels to Handle Larger Motions

In general, the maximum motion amplitude that can be handled may be limited. For example, this limit can be on the order of two pixels. In order to handle larger motions, the video can be spatially downsampled. As one example of downsampling, a 100×100 pixel video frame can become, effectively, a 50×50 pixel frame, such that a motion of four pixels in the original video becomes a motion of, effectively, one pixel. It should be understood that other variations of downsampling can be part of embodiment procedures, including averaging over different numbers of pixels and even averaging over different ranges of pixels for different axes of video images, for example.

The video can be further downsampled by factors of 2, for example. However the effective noise floor is increased, as each pixel then spans twice the physical distance. Downsampling can be accomplished in a number of ways, from averaging neighboring pixels, for example, to applying a filter kernel, such as a binomial filter, for example.

Displacement Extraction from Video

Embodiment procedures can include taking a video of a vibrating object and determining the displacement signal everywhere on the structure in the image using a technique related to phase-based motion magnification. Such magnification has been described, for example, in Wadhwa, N., Rubinstein, M., Durand, F. and Freeman, W. T., *Phase-Based Video Motion Processing*, ACM Trans. Graph. (Proceedings SIGGRAPH 2013), Vol. 32, No. 4, 2013, for example. Typically, a displacement signal is well-defined only at edges of an object in the video. Further, displacement signals are typically well-defined only in the direction perpendicular to edges of the object. This is because the motion of textureless, homogenous regions is locally ambiguous. Determining the motion of an object at object locations where it is ambiguous is an open problem in computer vision known as dense optical flow. Dense optical flow has been described, for example, in Horn, B. and Schunck, B., *Determining optical flow*, Artificial intelligence, Vol. 17, No. 1-3, pp. 185-203, 1981 and Lucas, B. D. and Kanade, T., *An Iterative Image Registration Technique with an Application to Stereo Vision, Proceedings of the 7th International Joint Conference on Artificial Intelligence (IJCAI '81)*, pp. 674-679, April 1981, for example.

For purposes of modal detection, as a significant advance in processing speed and accuracy, embodiments described herein can use only motion at the edges of an object in a video stream. In the case of a cantilever beam, such as the polycarbonate beam described hereinafter, the entire beam is an edge, and the displacement signal can be determined based on all signals along the edge, as described herein, a technique based on local phase and local amplitude in oriented complex spatial bandpass filters can be used to simultaneously compute both the displacement signal and the edge strength. Certain aspects of such local phase and local amplitude determination have been described in Fleet, D. J. and Jepson, A. D., *Computation of component image velocity from local phase informa-tion*, Int. J. Comput. Vision, Vol. 5, No. 1, pp. 77-104, September 1990 and Gautama, T. and Van Hulle, M., *A phase-based approach to the estimation of the optical flow field using spatial filtering*, Neural Networks, IEEE Transactions on, Vol. 13, No. 5, pp. 1127-1136, sep 2002, for example, which are incorporated herein by reference in their entirety.

Local phase and local amplitude are local qualities that are analogous, on a local level, to the phase and amplitude represented in Fourier series coefficients. The phase controls the location of basis function, while the amplitude controls its strength. In the case of the Fourier transform, the phase corresponds to the global motion. Analogously, local phase gives a way to compute local motion. For a video, with image brightness defined by I(x, y, t) at spatial location (x, y) and time t, the local phase and local amplitude in orientation θ at the frame at time $t_0$ is computed by spatially can pass in the frame with a complex filter $G_2^\theta + iH_2^\theta$ to get $$A_\theta(x,y,t_0)e^{i\phi_\theta(x,y,t_0)} = (G_2^\theta + iH_2^\theta) \otimes I(x,y,t_0) \quad (1)$$

In Equation (1), $A_\theta(x, y, t_0)$ is the local amplitude, and $\varphi_\theta(x, y, t_0)$ is the local phase. The filters $G_2^\theta + H_2^\theta$ (also described as "G2/H2" filters herein) are specified in Freeman, W. T. and Adelson, E. H., *The design and use of steerable filters*, IEEE Transactions on Pattern analysis and machine intelligence, Vol. 13, No. 9, pp. 891-906, 1991, for example, which is incorporated herein by reference in its entirety. As used herein, an "undercomplete representation of frames within a video stream" includes the representation defined by Equation (1), for example. It should be noted, however, that other undercomplete representations can be formed by application of other oriented complex spatial bandpass filter pairs besides the G2/H2 filter pair.

In order to increase S/N ratio and change the scale on which the filters are operating, a video sequence can be downsampled (spatially averaged) a number of times. For example, downsampling can be performed four times in each dimension spatially, for example, prior to application of the filters.

Constant contours of the local phase through time correspond to the displacement signal. Using the notation of Equation (1), this can be expressed as:

$$\phi_\theta(x,y,t) = c \quad (2)$$

for some constant c. Differentiating with respect to time yields:

$$\left(\frac{\partial \phi_\theta(x, y, t)}{\partial x}, \frac{\partial \phi_\theta(x, y, t)}{\partial y}, \frac{\partial \phi_\theta(x, y, t)}{\partial t}\right) \cdot (u, v, 1) = 0. \quad (3)$$

In Equation (3), u and v are the velocity in the x and y directions, respectively. It is approximately the case that $$\frac{\partial \phi_\theta(x, y, t)}{\partial y} \approx 0 \text{ and } \frac{\partial \phi_{\pi/2}(x, y, t)}{\partial x} \approx 0.$$

Thus, the velocity in units of pixels is:

$$u = -\left(\frac{\partial \phi_0(x, y, t)}{\partial x}\right)^{-1} \frac{\partial \phi_0(x, y, t)}{\partial t} \text{ and } v = \quad (4)$$

$$-\left(\frac{\partial \phi_\pi(x, y, t)}{\partial y}\right)^{-1} \frac{\partial \phi_{\pi/2}(x, y, t)}{\partial x}.$$

The velocity between the ith frame and the first frame for all i is computed to give a displacement signal in time. The result of the aforementioned processing is a displacement signal at all salient points in the image.

Thus, while the signals defined by Equation (1) can be referred to as "motion signals," as used herein, u and v, as defined in Equation (4), are specifically referred to as "Eulerian motion signals" herein. As described above, pixel-wise Eulerian motion signals (e.g., u and v in Equation (4)) of an object in frames of a video stream may be extracted from an undercomplete representation (as defined by Equation (1)) of frames within the video stream. Note that even where downsampling has occurred to reduce a number of pixel signals, the Eulerian motion signals extracted from such downsampled pixel signals are still referred to herein as "pixel-wise Eulerian motion signals." Alternatively, where downsampling has not occurred, for example, the pixel-wise Eulerian motion signals may be equal in number to the pixels within the frames of the video stream.

In addition, as described hereinafter, certain preprocessing can occur in disclosed embodiments in order to dramatically decrease processing time. This displacement preprocessing can occur after obtaining the undercomplete representation $A_\theta(x,y,t_0)e^{i\Phi_\theta(x,y,t_0)}$ of frames within the video stream. Furthermore, preprocessing steps can occur after extracting the Eulerian motion signals from the undercomplete representation, as described hereinafter, and as indicated in FIG. 2B, for example.

Displacement Preprocessing and Local Contrast

Local contrast is the amount of visual texture or variedness of the pixel values in the local region around a pixel in a video frame. Motion signals are typically much better defined in locations of a video frame with sufficient local contrast. Thus, there are significant advantages of determining the motion only of pixels with sufficient local contrast, while ignoring relatively textureless or homogenous regions in the video due to the aperture problem. As used herein, "downselecting" denotes limiting a number of pixel-wise Eulerian motion signals for increased processing speed. One way to limit the number of pixel-wise Eulerian motion signals is by selecting only pixels (or signals corresponding to such pixels) that have at least a given threshold of local contrast. Downselecting pixels on the basis of local contrast can be done by applying (i) a signal energy filter, (ii) a local contrast thresholding filter, or both. (i) Signal energy, along with an example threshold for signal energy, is defined in Equation (5) and further described hereinbelow.

(ii) A further metric for local contrast applied in testing described herein is the amplitude of the signal, after the quadrature filter pair (e.g., G2/H2 filter pair) is applied. The amplitude of the motion signals, which results from application of the G2/H2 filter pair, is given hereinabove as $A_\theta(x,y,t_0)$ in Equation (1). The greater the signal amplitude, the greater the local contrast, and the more reliable the motion signal will generally be. As will be understood, various threshold values for $A_\theta(x,y,t_0)$ can be applied, depending on the specific application and equipment used, as well as the expected magnitude of motion being analyzed.

As will be further understood, in addition to (i) and (ii) as described above, various other alternative metrics can be used to determine local contrast. Furthermore, where signal amplitude is used as a metric, it will be understood that various threshold amplitudes can be defined as necessary or helpful for a specific application.

To calculate speed, processing may be conducted at a single physical scale for the filters in some cases. This can result in erroneous displacement signals being extracted when the motion is too large. Such erroneous displacement signals do not represent real motion, and it is desirable for them to be eliminated (filtered out). As described hereinabove in relation to FIG. 2B, an outlier analysis can be used to automatically remove erroneous displacement signals instead of removing such signals manually. For each displacement timeseries $d_{i,j}(t)$ corresponding to a given pixel, the signal energy is calculated by:

$$\text{Signal Energy} = \Sigma |d_{i,j}(t)|^2. \quad (5)$$

Signals with excessively large signal energies may not correspond to real displacements of the measured object. A multiple of the median of all the signal energies, nominally a factor of 10, for example, can be used as a threshold above which the signals can be considered erroneous and, thus, excluded. In other embodiments, other thresholds can be used.

Displacement preprocessing may also include signal averaging. As described in relation to FIG. 2B, and as further described in the next subsection, and FFT can be used to obtain a frequency spectrum for each of the displacement signals to identify operational mode shapes and resonant frequencies. In some embodiments, individual pixel displacements $d_{i,j}(t)$ (motion signals) can be averaged together prior to performing an FFT. However, in other embodiments, an FFT can be performed on each motion signal, and the frequency spectra of all the motion signals can be averaged together to give the average frequency spectrum for the recorded video frames. From this average frequency spectrum, potential resonant frequencies can be chosen to identify operational mode shapes, as described in following.

Identification of Operational Mode Shapes and Resonant Frequencies

Analysis of the average frequency spectrum for peaks in the spectrum can indicate potential resonant frequencies for the measured object. As used herein, "average frequency spectrum" can denote either the frequency spectrum determined by calculating FFTs for individual pixel signals and then averaging the resulting frequency spectra, or the spectrum obtained by first averaging motion displacement signals for individual pixels, followed by performing an FFT on the averaged pixel-wise motion signals. Peaks in the edge frequency spectrum can be automatically found using a commercially available peak finding function.

Alternatively, peaks can be identified manually by an experienced user or by using one of various different software packages. These resonant peaks tend to be distinctively spaced and tend to be significantly higher than the surrounding noise floor in the frequency spectrum. To determine the operational mode shapes, values for magnitude and phase can be determined at each resonant frequency. To determine the magnitude, the amplitude of the FFT for each pixel can be used, normalized by the pixel at that frequency with the largest amplitude. To determine the phase, the cross power spectral density (PSD) for each pixel can be taken with reference to a single signal, nominally the pixel with the largest displacement. For each resonant frequency, the phase can be thresholded and to be either completely in phase or 180° out of phase to represent points on the mode shape that are moving in phase or in opposite phase, respectively.

To enhance speed of processing, a peak picking method can be used to identify operational mode shapes from the signals extracted from video. While other methods can also be used, peak picking is one of the most straightforward methods to identify operational mode shapes from displacement signals in the frequency domain. Peak picking involves determining the FFT of the displacement time signals and picking out peaks in the frequency domain that correspond to candidate resonant modes. The peaks are chosen from an average frequency spectrum for salient pixels across the whole video. This average frequency spectrum can be obtained by either (i) averaging the detrended pixel time series signals, followed by determining the FFT of the averaged signal, or (ii) determining the FFT of every pixel time series, followed by averaging together the FFTs. Due to detrending of the time series signals, the results for (i) and (ii) may end up being slightly different.

Cross power spectral densities (PSD) can then be calculated with reference to a single signal to determine the phase difference between the displacement signals at the frequencies of interest. This information, combined with the normalized magnitudes of the FFT at the picked frequencies, creates the operational mode shape.

Given a displacement signal of $d_{i,j}(t)$ for pixel at location i,j in the video, with FFT of $\hat{d}_{i,j}(f)$ the cross PSD (cPSD) (ignoring scaling factors) referenced to a pixel r is:

$$cPSD_{i,j|r}(f) = \overline{\hat{d}_{i,j}(f)} * \hat{d}_r(f) \quad (6)$$

The phase difference between the pixel at i,j and the reference pixel is the phase angle of the complex value $cPSD_{i,j|r}(f)$. The mode shape $\varphi_f(i,j)$ (not to be confused with the phase) at a specific frequency $f_0$ is then $$\varphi_{f_0}(i, j) = \begin{cases} |\hat{d}_{i,j}(f_0)| & \text{if } | < cPSD_{i,j|r}(f_0)| < \frac{\pi}{2} \\ -|\hat{d}_{i,j}(f_0)| & \text{if } | < cPSD_{i,j|r}(f_0)| \geq 0 \end{cases} \quad (7)$$

The mode shape can then be normalized by the maximum value of $\varphi_{f_0}(i,j)$ such that it ranges from −1 to 1.

Visualization with Motion Magnification

As described hereinabove in relation to FIG. 1 and FIG. 2B, for example, embodiment procedures and devices can be used to, optionally, create displays that include exaggerated views of operational mode shapes and object displacements. Such visual displays can also be used as additional verification for testing embodiment procedures and for additional confirmation that the selected operational mode shapes and resonant frequencies are representative of the measured object. In some embodiments, a fast phase-based motion magnification can be used to visualize, qualitatively, the mode shapes at the resonant frequencies chosen. Such motion magnification is described in Wadhwa, N., Rubinstein, M., Durand, F. and Freeman, W. T., *Riesz Pyramid for Fast Phase-Based Video Magnification, Computational Photography (ICCP)*, 2014 *IEEE International Conference on*, IEEE, 2014, for example, which is incorporated herein by reference in its entirety. Processing time can be larger where motion magnification is performed. However, in some embodiments, procedures including motion magnification can still be fast enough to be considered near real-time, depending on how many motion magnified videos need to be generated. The visualization can allow a system user, for example, to determine whether a mode shape appears to be physically real, rather than a harmonic. Such visualization can also permit a user to analyze, quickly, by eye the object under test.

Motion magnification is described further in Rubenstein et al., U.S. Pat. Pub. No. 2014/0072228, "Complex-Valued Eulerian Motion Modulation" (hereinafter "Rubenstein"), Wadhwa et al., U.S. Pat. Pub. No. 2014/0072229 "Complex-Valued Phase-Based Eulerian Motion Modulation" (hereinafter "Wadhwa"), and Wu et al., U.S. Pat. Pub. No. 2014/0072190, "Linear-Based Eulerian Motion Modulation" (hereinafter "Wu"), which are hereby incorporated by reference in their entirety.

Figure 3:
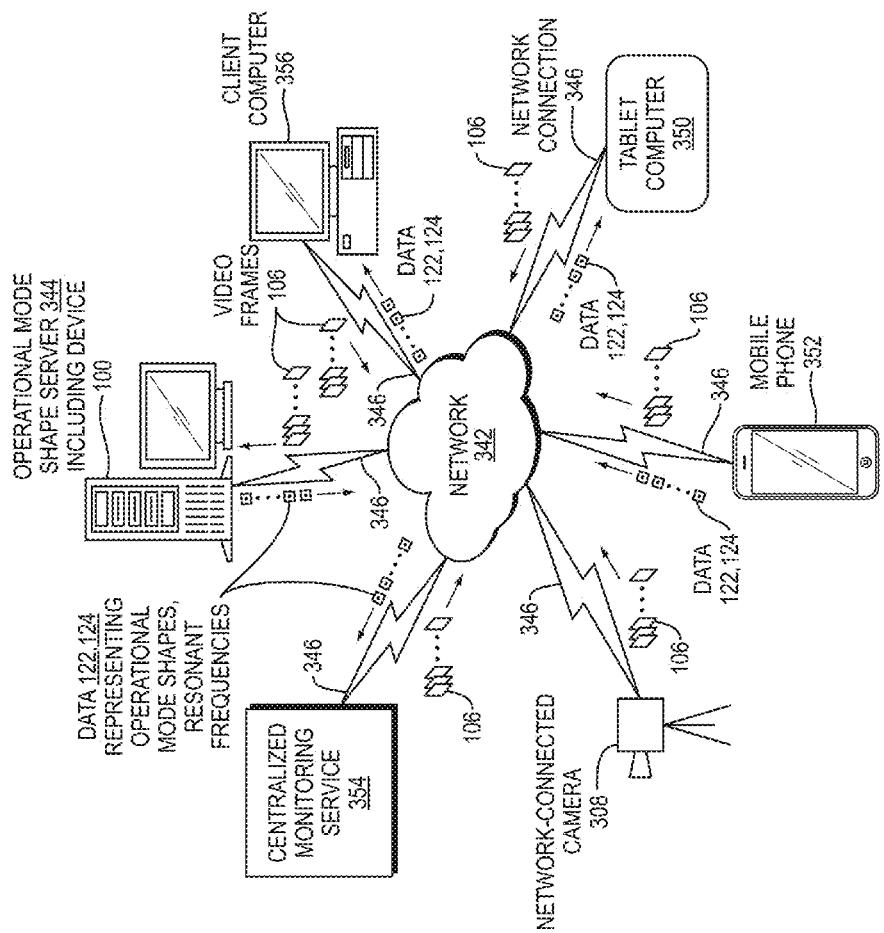
FIG. 3 is a schematic diagram of a network environment in which various embodiments of the invention can operate.

FIG. 3 is a schematic diagram of a network environment 342 in which various embodiments of the invention can operate. An operational mode shape server 344 can include the device 100 illustrated in FIG. 1. Thus, the server 344 can identify operational mode shapes using the procedures illustrated in FIGS. 2A and 2B, for example. The server 344 can be in communication with various devices and locations via the network 342, which includes network connections 346. The network connections 346 can include, for example, Wi-Fi signals, ethernet connections, radio or cell phone signals, serial connections, or any other wired or wireless form of communication between devices or between a device and the network connections 346 that support the communications.

The server 344 can receive video frames 106 from various network-connected devices, including a client computer 356, a tablet computer 350, a mobile phone 352, and a network-connected camera 308. Devices such as the mobile phone 352 can include a camera configured to acquire the frames of the video stream of the object being monitored for vibrations. However, in other embodiments, devices such as the client computer 356 can receive video frames 106 from other sources, such as the video camera 108 illustrated in FIG. 1 or any other source of video frames showing an object to be monitored. Video frames 106 are sent through the network 342 to the operational mode shape server 344.

The server 344 response back through the network 342 to the devices 308, 352, 350, and 356. The reporting can include the data 122 and 124 representing operational mode shapes and resonant frequencies, as illustrated in FIG. 1. Furthermore, the server 344 can also be configured, optionally, to provide images such as the image 128 and vectors 130 for visual display, as illustrated in FIG. 1. Thus, the network-connected devices illustrated in FIG. 3 can receive not only data representing operational mode shapes and resonant frequencies, but also images that can be displayed, if necessary.

Also connected to the network 342 is a centralized monitoring service 354. The centralized monitoring service 354 can include a government, military, civil engineering, or other industrial-use center that can store video frames 106 received via the network 342 from various devices and locations, for example. Where necessary, the centralized monitoring service 354 can also upload video frames 106 captured with the various network devices or received from other sources not illustrated to the operational mode shape server 344 via the network 342. The centralized monitoring service 354 can then receive data 122 and 124 images 128 and 130, or any other data provided by the various networked devices or the server 344.

In one embodiment, the centralized monitoring service 354 is a civil engineering firm providing structural or vibrational analysis services by subscription, for example. As will be understood, the operational mode shape server 344 can be located at the centralized monitoring service 354. Furthermore, other operational mode shape servers may be located at other network locations.

As an alternative, any one of the networked devices such as the client computer 356, tablet computer 350, or mobile phone 352 could be configured to include memory 102 and a processor 104, as illustrated in FIG. 1, to perform the specialized data processing functions of the device 100 in the server 344.

Example Measurements

FIG. 4A illustrates a desktop experiment set up to perform measurements according to embodiments of the invention. Operational mode shapes and resonant frequencies of a polycarbonate beam 458 were measured. The polycarbonate beam 458 was clamped at the bottom to a desk using a desk device 464 rigid attachment. Measurement equipment consisted of a video camera 408 connected to a laptop computer 456 specially configured, as described in FIG. 1, to identify operational mode shapes by appropriately processing recorded video. During measurements, the polycarbonate beam 458 was struck by a hammer to cause the beam to vibrate. The recorded video provided by the camera 408 had a resolution of 236×188 at 399.2 frames per second (fps). A total of 1000 frames of the video were recorded during the measurement over a duration of 2.5 seconds.

FIG. 4B is a photograph showing one screenshot of the recorded video produced by the camera 408. End-to-end processing of the video was completed in approximately 2 minutes, where, in this case, processing included collecting the video as well as generating the plots showing the operational mode shapes for automatically selected, candidate, resonant frequencies. Approximately 5 additional minutes were used to generate four motion-magnified videos at the resonant frequencies selected by the user.

Between FIGS. 4B and 4C, G2/H2 filtering was applied to pixels of the frames to obtain an undercomplete representation, as described hereinabove in relation to FIG. 4B.

FIG. 4C illustrates, in white, downselected pixels of the image in FIG. 4B for which Eulerian motion signals were calculated. As expected, and is described further hereinabove, the downselected signals correspond to pixels showing the edges of the polycarbonate beam 458. Downselection is further described hereinabove. Thus, the downselected signals corresponding to the pixels at edges of the beam 458 constitute a representative set of motion signals that are downselected on the basis of contrast. Furthermore, Eulerian motion signals calculated from the downselected pixels constitute a representative set of Eulerian motion signals of the beam object 458.

FIG. 5A and FIG. 5B are graphs illustrating composites of all the Eulerian displacement signals and their frequency spectra, respectively, for the downselected set of pixels illustrated in FIG. 4C. Thus, FIG. 5A shows displacement, time series, pixel-wise motion signals $d_{i,j}(t)$ for the downselected pixels. Correspondingly, FIG. 5B illustrates the FFTs for all individual pixels illustrated in FIG. 4C. In both FIGS. 5A and 5B, the lines of different colors represent different pixels.

FIG. 6A and FIG. 6B are averaged spectra corresponding to the graphs illustrated in FIGS. 5A and 5B, respectively. In particular, FIG. 6A shows an average displacement signal averaged over all relevant pixels illustrated in FIG. 5A. Analogously, FIG. 6B shows an average composite of all the FFT spectra for relevant pixels that are illustrated in FIG. 5B. In FIG. 6B, it will be noted that various potential resonant frequencies can be seen, indicated by the respective peaks in the composite FFT at 3.593 Hz, 23.55 Hz, 61.08 Hz, and 135.7 Hz. These potential resonant frequencies were identified manually by inspection of the graph in FIG. 6B. Separately, five potential resonant frequencies were identified automatically, namely at 3.593 Hz, 7.185 Hz, 19.96 Hz, 23.55 Hz, and 27.14 Hz. Some of the automatically picked resonant frequencies can be side bands of true resonant frequencies and thus non-physical. This is the case for the automatically picked resonant frequencies in FIG. 6B, where some of the automatically chosen frequencies are side bands of the first two true resonant frequencies at 3.593 Hz and 23.55 Hz.

FIGS. 7A, 7B, and 7C are various operational mode shape illustrations corresponding to the manually chosen resonant frequencies. In particular, FIG. 7A shows operational mode shape amplitude on a per-pixel basis, with the amplitude indicated color wise in a scale at right. The magnitudes illustrated in color are proxies for the results of Equation (7), disregarding phase. Each mode shape representation corresponds to the manually chosen frequency listed at the bottom of the corresponding mode shape pattern.

FIG. 7B includes graphs showing mode shape phase corresponding to each of the manually chosen frequencies, with color-coded phase scales shown at the right of each mode shape phase representation. In FIGS. 7A-7B, the vertical axis is in units of pixels, and the horizontal axis is also in units of pixels, corresponding to location in the image. The z axis, which is color coded, represents normalized magnitudes (values) of phase, from 0 to π, which are the absolute values, shown in Equation (7), of the phase angles defined in Equation (6).

FIG. 7C includes graphs corresponding to each of the manually chosen frequencies, again labeled with the appropriate frequency below each graph. FIG. 7C shows one-dimensional representations of given mode shapes corresponding to each manually chosen frequency. The one-dimensional mode shapes were obtained by a weighted average of horizontal rows of the corresponding mode shapes for corresponding frequencies, with effective edge strengths as weights, as illustrated in FIG. 7A. In FIG. 7C, as in FIGS. 7A-7B, the vertical axis is in units of pixels and represents pixel height in the image. However, the x axis in FIG. 7C is a normalized magnitude (value) representing the weighted average of each pixel row. Inspection of the mode shapes of the manually chosen resonant frequencies, as illustrated in FIG. 7C, indicates that they correspond to the first four bending modes of the polycarbonate beam 458. Further confirmation of these four bending modes was obtained through motion magnification videos of the polycarbonate beam 458 at each of the manually chosen frequencies.

FIGS. 8A, 8B, and 8C illustrate operational mode shapes, mode shape phase, and one-dimensional mode shape representations, respectively, for the automatically chosen resonant frequencies. The representations shown in these graphs, including units, are analogous, with the exception of frequency differences, to the representations illustrated in FIGS. 7A-7C, respectively.

FIG. 9A and FIG. 9B are photographs illustrating an individual frame of the video obtained using the experimental setup shown in FIG. 4A, with the video obtained using a speed of 2000 frames per second (fps). In addition to the cantilever steel beam 962, FIGS. 9A and 9B also show a tracking object 960 mounted on the cantilever beam 962, which was used as a moving object from which to extract displacements. FIG. 9A is a cropped version of the video frame, with a cropped size of 301×201 pixels, while FIG. 9B shows the entire frame, with a full size of 576×576 pixels.

FIGS. 10A-10C are tables showing speed comparison data for extraction of displacements from a video. The tables compare G2/H2 filter usage, per embodiments described herein, with the cases of using an overcomplete complex steerable pyramid and public-domain NCORR DIC software. In particular, the table in FIG. 10A illustrates elapsed times and processor CPU times for complex steerable pyramid, NCORR DIC, and G2/H2 (partial, horizontal displacements) for the case of frames of 301×201 pixels, for a total of 60,501 pixels. A total of 100 frames were obtained. During the processor CPU times, the video was processed into displacement signals for each pixel in the video frames. Thus, a displacement time series signal was obtained for every pixel in the video frame.

FIG. 10B illustrates similar measured times for the case of a larger array of 576×576 pixels, for a total of 331,776 pixels (a factor of 5.48 times more pixels than the case of 301×201 pixels shown in FIG. 10A). FIG. 10C shows respective factors for increase in processing time for the three methods. From FIGS. 10A-10B it will be noted that for the G2/H2 and complex steerable pyramid approaches, processing time scales approximately linearly with the total number of pixels to be processed. In contrast to the G2/H2 methods, the NCORR DIC processing time scales superlinearly with the total number of pixels. Thus, as video frames become larger, the NCORR DIC procedure can become prohibitively time consuming and preclude near-real-time vibrational analysis. It will also be noted that in both FIGS. 10A and 10B, the G2/H2 processing times are significantly faster than the corresponding complex steerable pyramid processing times. In particular, the G2/H2 processing times are 1-2 orders of magnitude shorter (factors of about 52.5/1.31=40 times and about 313.8/6.65=47 times shorter, respectively) than the corresponding processing times for the complex steerable pyramid approach.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of identifying operational mode shapes of an object in a video stream, the method comprising:
    extracting pixel-wise Eulerian motion signals of an object from an undercomplete representation of frames within a video stream;
    downselecting signals from the pixel-wise Eulerian motion signals to produce a representative set of pixel-wise Eulerian motion signals of the object; and
    identifying operational mode shapes of the object based on the representative set of pixel-wise Eulerian motion signals from the undercomplete representation of the frames within the video stream.

2. The method of claim 1, further comprising identifying motion frequencies of the object based on the representative set of motion signals from the undercomplete representation of the frames within the video stream.

3. The method of claim 1, wherein the pixel-wise Eulerian motion signals are equal in number to the pixels within the frames of the video stream.

4. The method of claim 1, wherein downselecting the signals includes choosing signals on the basis of local contrast in the frames within the video stream.

5. The method of claim 1, wherein end-to-end processing of the video stream to identify the operational mode shapes of the object is performed at a rate at least one order of magnitude faster than Ncorr digital image correlation (DIC).

6. The method of claim 1, further including downsampling signals prior to extracting the pixel-wise Eulerian motion signals.

7. The method of claim 1, further including performing an outlier analysis to remove erroneous motion signals from the pixel-wise Eulerian motion signals.

8. The method of claim 1, further comprising averaging motion signals of the representative set of motion signals, and wherein identifying operational mode shapes of the object includes using the averaged motion signals.

9. The method of claim 1, further comprising generating a visual representation of the operational mode shapes or motion signals of the object.

10. The method of claim 1, further comprising uploading the frames within the video stream to a remote server or downloading the operational mode shapes from the remote server.

11. The method of claim 1, wherein the extracting, downselecting, and identifying occur at a network server and operate on the frames received via a network path.

12. The method of claim 1, wherein identifying the operational mode shapes includes determining a frequency spectrum for each motion signal of the representative set of motion signals.

13. A device for identifying operational mode shapes of an object in a video stream, the device comprising:
    memory configured to store frames from a video stream of an object; and
    a processor configured to:
        extract pixel-wise Eulerian motion signals of the object from an undercomplete representation of the frames from the video stream,
        downselect signals from the pixel-wise Eulerian motion signals to produce a representative set of pixel-wise Eulerian motion signals of the object, and
        identify operational mode shapes of the object based on the representative set of pixel-wise Eulerian motion signals from the undercomplete representation of the frames within the video stream.

14. The device of claim 13, wherein the processor is further configured to identify motion frequencies of the object based on the representative set of motion signals from the undercomplete representation of the frames within the video stream.

15. The device of claim 13, wherein the pixel-wise Eulerian motion signals are equal in number to the pixels within the frames of the video stream.

16. The device of claim 13, wherein the processor is further configured to downselect the signals on the basis of local contrast in the frames within the video stream.

17. The device of claim 13, wherein the processor is further configured to perform end-to-end processing of the video stream to obtain the operational mode shapes of the object at least one order of magnitude faster than Ncorr digital image correlation (DIC).

18. The device of claim 13, wherein the processor is further configured to downsample signals prior to extracting the pixel-wise Eulerian motion signals.

19. The device of claim 13, wherein the processor is further configured to perform an outlier analysis to remove erroneous motion signals from the pixel-wise Eulerian motion signals.

20. The device of claim 13, wherein the processor is further configured to average two or more motion signals of the representative set of motion signals and to identify the operational mode shapes of the object based on the averaged representative set of motion signals.

21. The device of claim 13, further comprising a visual interface configured to display a representation of the operational mode shapes or motion signals of the object.

22. The device of claim 13, further comprising a communications interface configured to upload the video stream of the object to a remote server or to download the operational mode shapes of the object from the remote server.

23. The device of claim 13, wherein the memory and processor form part of a network server configured to receive the frames from the video stream via a network path.

24. The device of claim 13, wherein the processor is further configured to determine a frequency spectrum for each motion signal of the representative set of motion signals.

25. The device of claim 13, wherein the memory is operational mode shape video storage memory configured to store a number of video frames spanning at least one motion period corresponding to a resonant frequency of the object.

26. The device of claim 13, wherein the processor is an operational mode shape data processor configured to receive the video frames of the object and to extract the pixel-wise Eulerian signals by applying oriented complex spatial band-pass filters to data representing individual pixels of the frames within the video stream.

27. The device of claim 26, wherein the operational mode shape data processor is further configured to determine local phase and local amplitude to extract the pixel-wise Eulerian motion signals and determine edge strength of pixels in the frames within the video stream simultaneously.

28. A quality control system comprising the device of claim 13, wherein the object is a product being manufactured or tested, the system further including:
    a vibration transducer configured to cause vibration of the product; and
    an operational mode shape video camera configured to capture images of the product during vibration.

29. An equipment monitoring system comprising the device of claim 13, wherein the object comprises a component of a machine, the component in motion during machine operation, the system further comprising an operational mode shape video camera configured to capture images of the one or more components in motion, and wherein the processor is further configured to identify an unwanted motion frequency in the component in motion.

30. A device for identifying operational mode shapes of an object in a video stream, the device comprising:
    means for extracting pixel-wise Eulerian motion signals of an object from an undercomplete representation of frames within a video stream;
    means for downselecting signals from the pixel-wise Eulerian motion signals to produce a representative set of pixel-wise Eulerian motion signals of the object; and
    means for identifying operational mode shapes of the object based on the representative set of pixel-wise Eulerian motion signals from the undercomplete representation of the frames within the video stream.

31. The method of claim 4, wherein choosing signals on the basis of local contrast includes at least one of applying a signal energy filter and applying a local contrast thresholding filter.

32. The device of claim 16, wherein the processor is further configured to downselect the signals on the basis of local contrast by applying at least one of a signal energy filter and a local contrast thresholding filter.

* * * * *